United States Patent [19]

Carraher, Jr. et al.

[11] 4,312,981

[45] Jan. 26, 1982

[54] MODIFIED CELLULOSIC PRODUCTS HAVING ENHANCED THERMAL, SOLVENT, AND BIOLOGICAL PROPERTIES

[75] Inventors: Charles E. Carraher, Jr., Fairborn; David J. Giron, Dayton; Jack A. Schroeder; Christy A. McNeely, both of Fairborn, all of Ohio

[73] Assignee: Wright State University, Fairborn, Ohio

[21] Appl. No.: 136,572

[22] Filed: Apr. 1, 1980

[51] Int. Cl.³ .................... C08B 11/00; C08B 11/193; C08B 15/05

[52] U.S. Cl. ..................................... 536/84; 8/115.5; 8/120; 536/90; 536/101

[58] Field of Search ..................... 536/56, 84, 90, 101; 8/115.5, 120

[56] References Cited

U.S. PATENT DOCUMENTS

| | | | |
|---|---|---|---|
| 3,053,607 | 9/1962 | Gulledge | 536/101 |
| 3,240,795 | 3/1966 | Ramsden | 536/101 |
| 3,563,978 | 2/1971 | Ochs | 536/101 |
| 3,817,702 | 6/1974 | Paulus et al. | 8/120 |
| 3,907,958 | 9/1975 | Tsuji et al. | 264/184 |
| 3,919,190 | 11/1975 | Barker et al. | 536/101 |
| 3,933,877 | 1/1976 | Wirth et al. | 101/308 Q |
| 4,043,952 | 8/1977 | Ganslaw et al. | 536/56 |

OTHER PUBLICATIONS

Carraher et al., "Modification of Cotton for Enhanced Thermal, Solvent and Biological Properties", *Organic Coatings and Plastics Chemistry*, vol. 40, p. 560, (Apr. 1979).

*Primary Examiner*—Ronald W. Griffin
*Attorney, Agent, or Firm*—Biebel, French & Nauman

[57] ABSTRACT

Solubilized cellulosic material is modified through a condensation reaction with organotin halides. The modified products exhibit lower heats of combustion in air than unmodified cellulose, are hydrophobic and resistant to hydrolysis, and inhibit the growth of a variety of common fungi. The modified products are useful as insulation materials, mildew and mold resistant fabrics, and as material for topical bandages.

9 Claims, No Drawings

MODIFIED CELLULOSIC PRODUCTS HAVING ENHANCED THERMAL, SOLVENT, AND BIOLOGICAL PROPERTIES

BACKGROUND OF THE INVENTION

This invention relates to the modification of cellulose through condensation with organotin compounds to yield products having enhanced thermal, solvent, and biological properties.

Cellulose is a naturally occurring polymeric carbohydrate making up about one third of all vegetable matter. Cotton is a relatively pure natural cellulose containing only about 3-15% noncellulosic material. Cotton has long been a commercially important source of fibers for textiles and the like.

Because of its importance, many attempts to modify and improve upon the properties of cotton fibers and textiles have been made. For example, the many commercially available types of rayon are the result of modification to the structure of cellulose to improve its properties. Other examples of cotton modification include U.S. Pat. No. 3,053,607 which teaches reacting an alkyl metalate of titanium, zirconium, hafnium, thorium, aluminum, iron, or antimony with cellulosic materials to yield products having improved mildew, abrasion, and flame resistance.

Organic tin-containing compounds are also known to possess biocidal activity (see U.S. Pat. No. 3,933,877) and it has been suggested to add such tin compounds to cellulosic materials to combat mildew and other fungal growths (see U.S. Pat. No. 3,240,795). However, it would be much more desirable to be able to incorporate such tin-containing compounds permanently and intimately into the structure of cellulosic materials. To our knowledge, no tin or tin-containing compounds have previously been intimately incorporated into the structure of cellulose.

Accordingly, the need exists in the art for a process to incorporate tin into the structure of cellulose and for a tin-containing cellulose having enhanced thermal, solvent, and biological properties.

SUMMARY OF THE INVENTION

In accordance with the present invention, cellulosic material is modified through a condensation reaction with an organic tin-containing compound at the interface of an aqueous phase containing the cellulosic material and an immiscible organic phase containing the tin compound. As the organic tin-containing compound, compounds having the general formula $R_mSnX_{4-m}$ have been found to be suitable, where R is an aliphatic or aromatic hydrocarbon group, X is a halogen, and m is 2 or 3.

Any source of polysaccharides can be utilized including dextran, chitin, cotton, amylose, and amylopectin although it is preferred that cotton be used because it is a relatively pure form of cellulose. To prepare the cellulosic material for reaction, it must first be dissolved. Most essentially linear cellulose materials can be dissolved in solvents capable of breaking the strong hydrogen bonds. Examples of such solvents include aqueous solutions of inorganic acids, calcium thiocyanate, zinc chloride, iron sodium tartrate, ammonium hydroxide, and cadmium or copper ammonium hydroxide (or related metalamine combinations). Examples of nonaqueous solvents include dimethylformamide and dimethylsulfoxide containing added salts such as lithium chloride. Some cellulose materials such as dextran are soluble in water without the need for the addition of other solvents.

Two sources of cellulose will be utilized as exemplary of water soluble and water insoluble cellulosic materials. Dextran is exemplary of a water soluble cellulosic material, and it will be understood that other water soluble cellulose materials are likewise useful in the practice of the present invention. Cotton will be utilized as exemplary of water insoluble cellulosic materials, and it will be again understood that other water insoluble cellulose materials are useful in the practice of the present invention.

Although many techniques are available for solubilizing water insoluble cellulose materials, one preferred method is to dissolve them in aqueous solutions containing added inorganic or organic bases such as bisethylenediamine copper (II) hydroxide. Mechanical agitation aids in solubilizing the cellulose, and solubilization is generally complete within one to two hours. On the other hand, water soluble cellulose materials such as dextran can easily be solubilized in water with agitation at room temperature.

The aqueous solution of cellulose containing added base is then added with stirring to a reaction vessel containing an organotin halide compound dissolved in an immiscible organic liquid such as methylene chloride, chloroform, or carbon tetrachloride. The condensation reaction proceeds rapidly at room temperatures (about 25° C.) at the interface between the aqueous and organic solutions. Rapid agitation increases the interfacial area available for reaction and reduces the total time required.

The product generally forms within 30 seconds to one minute and is then collected and washed. For reactions employing bisethylene diamine copper (II) hydroxide, the washings are repeated until the absence of blue coloration indicates that all residual copper has been removed. Such washings also serve to remove any unreacted tin-containing compound. Dilute acid such as sulfuric acid may be added to the reaction vessel to neutralize the solution and cause the precipitation of additional modified cellulose product.

Analysis of the product indicates the presence of tin in the cross-linked lattice structure of the cellulose. It is believed that the product is a combination of a number of modified structural units linked to each other or to unmodified cellulose units as illustrated below,

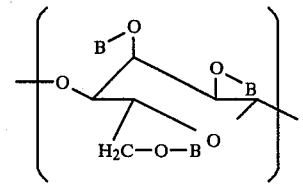

such that B is hydrogen, $SnR_m$, or $SnR_2OH$ where R is a hydrocarbon radical and n is 2 or 3, with the proviso that within a given change of structural units that all of the B groups are not hydrogen. The condensation reaction can be depicted to proceed via the following two routes where R and m are as above:

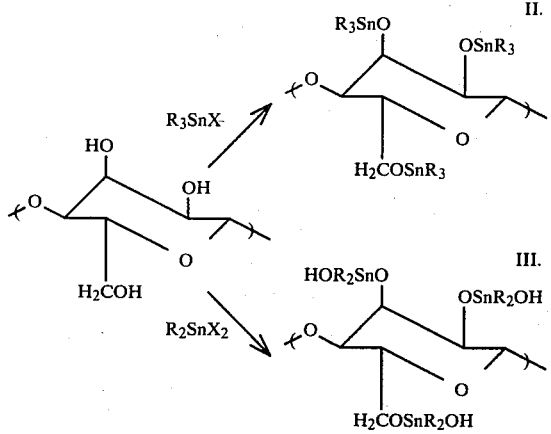

Structure II results if a trisubstituted organotin halide is used as a reactant, and structure III results in a disubstituted organotin dihalide is used. Of course, not all of the reactive sites will necessarily be substituted.

The modified cellulose product is hydrophobic and resistant to hydrolysis, giving it utility for usages requiring water stability, resistance, and/or repellency such as use as an insulation material, fabric additive, or topical bandage material. The product is solid, exhibits good flexibility, and typically has a much lower heat of combustion than unmodified cellulose giving it utility as a residential and commercial insulation material. Finally, the product exhibits inhibition characteristics against a number of common fungi giving it utility in applications where resistance to mildew, rot, and the like is required.

Accordingly, it is an object of the present invention to provide a modified cellulose product having enhanced thermal, solvent, and biological properties. This and other objects and advantages of the invention will become apparent from the following description and appended claims.

DESCRIPTION OF THE PREFERRED EMBODIMENTS

As the organic tin-containing compound used in the condensation reaction, it has been found that compounds having the general formula $R_mSnX_{4-m}$, where R is $C_1$ to $C_8$ alkyl, cycloalkyl, alkenyl, cycloalkenyl, aryl, and arylalkyl, X is a halogen, and m=2 or 3, produce suitable results. The reaction itself is carried out using an interfacial technique. The tin compound is added to an organic liquid such as methylene chloride or carbon tetrachloride while a cellulosic material such as cotton is solubilized and added to an aqueous solution. As mentioned, the solubilization of cellulose derived from sources such as cotton is preferably effected by adding bisethylenediamine copper (II) hydroxide to an aqueous solution containing cotton fibers and agitating the mixture. However, other known techniques for solubilizing cellulosic materials may be used.

The condensation reaction takes places upon mixing of the aqueous and organic solutions at the interface between the two immiscible phases. Rapid agitation of the two phase solution disperses the phases, increasing the interfacial area and thus increasing the rate of reaction. With agitation, the reaction proceeds rapidly at room temperature (25° C.) to yield a solid product although the reaction will proceed over a wide range of temperature limited only by the freezing and boiling points of the solutions utilized.

The mole ratio of organotin compound to cellulosic reaction sites may vary over a wide range. Preferably, however, the mole ratio of organotin to cellulosic reaction sites is from 0.3:1 to 5.0:1. The concentration of the reactants in their respective solutions may similarly vary over a wide range. It has been found that concentrations of organotin and cellulose of from 0.1 to 2.5 mmoles per 25 ml solution in their respective solutions yield suitable results. Both the product yield and amount of tin included in the modified cellulose structure can be widely varied.

The condensation product formed is believed to be a combination of modified structural units linked to each other or to unmodified cellulose structural units as in compound I. above, where B is hydrogen, $SnR_m$, or $SnR_2OH$ and where R is $C_1$ to $C_8$ alkyl, cycloalkyl, alkenyl, cycloalkenyl, aryl, and arylalkyl, and m=2 or 3 with the proviso that no more than two B groups are hydrogen. If the organotin monomer was a disubstituted dihalide, m will be 2 while if the monomer was a trisubstituted monohalide, m will be 3.

The modified cellulosic procucts exhibit enhanced thermal, solvent, and biological properties. The products have typically lower heats of combustion than unmodified cellulose rendering them suitable for use as insulation materials. The products are also hydrophobic and resistant to hydrolysis for utilities requiring water stability or repellency such as material for topical bandages. Finally, the products inhibit the growth of a wide variety of fungi giving them utility as mildew or rot resistant fabrics.

The invention may be better understood by reference to the following nonlimiting examples.

EXAMPLE 1

An aqueous solution (25 ml) of cellulose (0.62 mmoles) generated from cotton dissolved in bisethylenediamine copper II hydroxide is added to a rapidly stirred (about 20,500 rpm no load) solution of triphenyltin chloride (1.86 mmoles) in carbon tetrachloride (25 ml) at 25° C. for 30 seconds stirring time, resulting in precipitation of tin modified cellulose. The product was washed repeatedly with water until traces of blue coloration were no longer present. The yield of product was 0.50 grams and contained 19% tin.

EXAMPLE 2

An aqueous solution (30 ml) of cellulose (4.0 mmoles) derived from dextran containing triethylene diamine as the added base (36 mmoles) was added to a rapidly sitrred (about 18,600 rpm no load) solution of dibutyltin dichloride (6.0 mmoles) dissolved in carbon tetrachloride (30 ml) with stirring for 1 minute. Tin modified cellulose precipitated from the reaction system and was washed with water. A white product (3.60 grams) containing 15% tin was obtained.

EXAMPLE 3

The biological activity of the modified cellulose products was tested to provide an indication of their resistance to mildew and rot. Such resistance would improve the performance of such products for both topical-medical applications and for building material applications (such as insulation or paint additives).

The modified cellulosic product was prepared by reacting 25 ml of an aqueous solution of cotton (0.1 gm;

0.62 mmole) solubilized with bisethylenediamine copper (II) hydroxide with 25 ml of a carbon tetrachloride solution containing an organotin-halide compound at about 25° C. The reactants were rapidly stirred (20,500 rpm) for about 30 seconds. The recovered product was filtered and then washed repeatedly until all traces of blue color disappeared.

Two approaches were taken to investigate the antifungal activity of the modified products. The first was a disk assay procedure, and the second utilized protein determination as a measure of fungal growth in a liquid medium.

For the disk assays the test organisms, *Aspergillus fumigatus*, flavus and niger, obtained from the College of American Pathologists were used. Spores of each organisms were suspended in sterile water and innoculated (1000 cells) into Sabouraud's dextrose agar plates. Solid, ground and modified cellulosic products (0.1 gram), added to paper discs (Table 1), were placed at separate locations onto the innoculated medium. Inhibition of growth about the added cellulosic compounds was an indication of the antifungal potential of the particular compound after incubation at room temperature for 24 hours. Results are shown in Table 2. All but the products from dioctyltin dichloride showed good fungal inhibition.

To assess growth in a liquid medium the following procedure was carried out. *Trichoderma reesel*, strain QM-9414, and *Chaetominum globosum* were used.

To prepare cellulose for control media, absorbant cotton was added to concentrated hydrochloric acid, and then an equal volume of distilled water was subsequently added. After setting for 48 hours at room temperature, the acid solution was removed by filtration, and the cotton matt was washed repeatedly with distilled water. The cellulose matt was dried at 37° C. giving a material which could be pulverized to a fine powder with a mortar and pestle.

Each compound was added to a salt medium at a concentration of 1 mg of sample to 1 ml of solution. The salt solution consisted of 0.5 g $K_2HPO_4$, 3.5 g, $K_2HPO_4$, 0.5 g $(NH_4)_2SO_4$, 0.05 g $CaCl_2$, 0.05 g, $MgSO_4$ 7 $H_2O$, 1.0 g NaCl in 1000 ml distilled water. Homogeneous suspensions of the powdered samples were obtained by homogenizing the mixtures in a Teflon pestle homogenizer. Volumes of 2.5 ml were added to tubes (16×125 mm), capped and autoclaved at 15 lb. for 15 mins. A second series of media containing 1 mg dextrose per ml in addition to the cellulose test compounds and salts were prepared.

Spores of the fungi, grown for 1 to 2 weeks on Sabouraud's dextrose agar, were harvested in 0.15 N NaCl. Spores were washed twce with saline by centrifugation. Approximately $10^3$ to $10^4$ spores (0.1 ml)n were innoculated into each tube of medium. The tubes were placed in an inclined position on a rotary shaker (125 rpm) and incubated at 20° C. for 7 days.

Protein assay was the measure of growth and was done as follows. Cold perchloric acid was added to each culture tube after the 7 days of growth to make a concentration of 0.5 M. Pellets were collected after centrifugation at 2000 rpm in a Sorvall, GLC-2B laboratory centrifuge. The supernatant fluids were discarded; the pellets were then suspended in 2.5 ml of 1 N NaOH. Tubes containing the suspension were capped and autoclaved at 15 lbs. for 20 mins. Resulting solubilized protein in the supernatant fluids was determined using bovine serum albumin, fraction V, as the standard. Protein concentration was taken to be a measure of fungal growth as is reported in Tables 3 and 4.

| Organotin Halide Modifying Agent | Molar Ratio Tin:Cotton Reactive Groups in Reaction System | Tin % Found | Tin (Calculated Assuming Complete Reaction); Structure II & III | Initial Tegradation Temperature Air (°C.) | Sample Designation |
|---|---|---|---|---|---|
| Dipropyltin Dichloride | 5:1 | 21 | 27 | 280 | 1 |
| Triphenyltin Chloride | 5:1 | 20 | 29 | 210 | 2 |
| Dioctyltin Dichloride | 5:1 | 18 | 29 | 210 | 3 |
| Dioctyltin Dichloride | 2:1 | 18 | 29 | 210 | 4 |
| Dibutyltin Dichloride | 5:1 | 37 | 40 | 270 | 5 |
| Dibutyltin Dichloride | 4:1 | 40 | 40 | 270 | 6 |
| Dibutyltin Dichloride | 3:1 | 41 | 40 | 270 | 7 |
| Dibutyltin Dichloride | 2:1 | | | 270 | 8 |
| Dibutyltin Dichloride | 1:1 | | | 270 | 9 |
| Dibutyltin Dichloride | 0.50:1 | 44 | 40 | 270 | 10 |
| Dibutyltin Dichloride | 0.30:1 | 41 | 40 | 270 | 11 |
| Dibutyltin Dichloride | (itself) | | | | 12 |
| Cotton (itself) | | | | 310 | 13 |

TABLE 2

| | Growth Inhibition | | |
|---|---|---|---|
| Compound[a.] | A. Flavus | A. Niger | A. Fumagatus |
| 1 | 4 | 4 | 3 |
| 2 | 4 | 3 | 3 |
| 3 | 3 | 0 | 0 |
| 4 | 0 | 0 | 0 |
| 5 | 4 | 4 | 3 |
| 6 | 4 | 4 | 3 |
| 7 | 4 | 4 | 3 |
| 8 | 3 | 3 | 1 |
| 9 | 4 | 3 | 2 |

TABLE 2-continued

| | Growth Inhibition | | |
|---|---|---|---|
| Compound[a] | A. Flavus | A. Niger | A. Fumagatus |
| 10 | 3 | 3 | 2 |
| 11 | 4 | 4 | 2 |
| 12 | 4 | 4 | 4 |

[a]Designation given in Table 1.
[b]4 = 100%, 3 = 50%, 1 = 25%, 0 = 0%

TABLE 3

Growth of Trichoderma Reesel on tin modified cellulose compounds.

| | Growth ($\mu$g protein/ml) | |
|---|---|---|
| Compounds[a] | with dextrose | without dextrose |
| 1 | 70 | 30 |
| 2 | 140 | 213 |
| 3 | 170 | 62 |
| 4 | 280 | 40 |
| 5 | 30 | 40 |
| 6 | 30 | 40 |
| 7 | 30 | 30 |
| 8 | 30 | 30 |
| 9 | 30 | 20 |
| 10 | 30 | 30 |
| 11 | 30 | 30 |
| Cellulose | 420 | 250 |

[a]Designation from Table 1.

TABLE 4

Growth of Chaetomium Globosum on tin modified cellulose.

| | Growth ($\mu$g protein/ml) | |
|---|---|---|
| Compound[a] | with dextrose | without dextrose |
| 1 | 20[b] | 20 |
| 2 | 120 | 280 |
| 3 | 120 | 50 |
| 4 | 130 | 30 |
| 5 | 20 | 40 |
| 6 | 44 | 30 |
| 7 | 40 | 30 |
| 8 | 44 | 40 |
| 9 | 40 | 40 |
| 10 | 60 | 40 |
| 11 | 80 | 70 |
| Cellulose | 300 | 240 |

[a]Designations from Table 1.
[b]All values are an average of results from duplicate cultures.

Compared to growth of the fungi in solutions not containing tin modified cellulose, all the compounds tested were observed to inhibit the two fungi, except for the sample derived from triphenyltin chloride. Inhibition was greatest for those compounds derived from dipropyltin dichloride and dibutyltin dichloride. This is essentially the same conclusion which resulted from disk assays. Growth inhibition in the dextrose containing media indicated that inhibition was a result of the toxicity of the modified cellulose compounds on the fungi rather than merely an inability of the fungi to degrade the test compounds.

The fungi tested are typical and widespread and the results obtained are therefore indicative of the applicability of such modified cellulosic products for retardation of fungi related to rot and mildew.

EXAMPLE 4

Determinations of the burning properties of the modified cellulosic products were made to assess their suitability for insulating applications. The initial inception of degradation of the product in air was observed to vary between 210° and 280° C. depending upon the organotin halide modifying agent. See Table 1. By comparison, the inception of degradation of unmodified cotton in air was found to be 310° C.

Another thermal property heat of combustion, was measured for several modified products and compared with the heat of combustion for unmodified cotton. All of the products tested had heats of combustion less than that of cotton. The results are reported in Table 5 below.

| Relative heats of combustion for modified cellulosic materials | | | |
|---|---|---|---|
| Cellulose Modified with | Relative H[a] | Relative H[b] | Sample Designation (Table 1) |
| Cotton (itself) | 1.00 | 1.00 | |
| Dibutyltin dichloride | .97 | .57 | 6 |
| Dipropyltin dichloride | .78 | .73 | 1 |
| Diphenyltin dichloride | .65 | — | — |
| Triphenyltin chloride | .77 | .27 | 2 |
| Dioctyltin dichloride | .54 | .30 | 3 |

Since the modified products contribute less heat to burning in air, they are superior to cotton in this respect and would be suitable for use as insulating material.

While the products and methods described herein constitute preferred embodiments of the invention, it is to be understood that the invention is not limited to these precise products and methods, and that changes may be made in either without departing from the scope of the invention, which is defined in the appended claims.

What is claimed is:

1. A modified cellulosic composition having modified structural units:

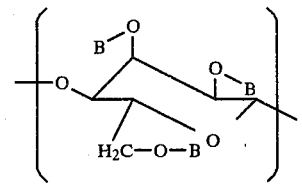

where B is hydrogen, $SnR_m$ or $SnR_2OH$, where R is $C_1$ to $C_8$ alkyl, cycloalkyl, alkenyl, cycloalkenyl, aryl, and arylalkyl, and m=2 or 3, with the proviso that within a given chain of structural units all of the B groups are not hydrogen, the modified structural units being linked to each other or to unmodified cellulose structural units in the cellulosic structure.

2. A process for the preparation of a modified cellulosic product comprising the steps of adding an aqueous solution of solubilized cellulose to an immiscible organic solution containing an organotin compound having the general formula $R_MSnX_{4m}$, where R is $C_1$ to $C_8$ alkyl, cycloalkyl, alkenyl, cycloalkenyl, aryl, and arylalkyl, X is halogen, and m=2 or 3, agitating the mixture, and recovering the resultant product.

3. The process of claim 2 in which R is $C_1$ to $C_8$ alkyl and X is chloride.

4. The process of claim 2 in which said immiscible organic solution is selected from the group consisting of methylene chloride, carbon tetrachloride, and chloroform.

5. The process of claim 2 in which the mole ratio of organotin compound to cellulose reactive sites is from 0.3:1 to 5.0:1.

6. The process of claim 2 in which said cellulose has been solubilized by the addition of bisethylenediamine copper (II) hydroxide.

7. The process of claim 5 in which from 0.1 to 2.5 mmoles solubilized cellulose per 25 ml water is present in the aqueous solution.

8. The process of claim 5 in which from 0.1 to 2.0 moles organotin compound per 25 ml organic solution is present in the reaction mixture.

9. A modified cellulosic composition produced by the process of claim 2.

* * * * *

UNITED STATES PATENT AND TRADEMARK OFFICE
CERTIFICATE OF CORRECTION

PATENT NO. : 4,312,981

DATED : January 26, 1982

INVENTOR(S) : Charles E. Carraher, Jr., Jack A. Schroeder
Christy A. McNeely, David J. Giron It is certified that error appears in the above—identified patent and that said Letters Patent is hereby corrected as shown below:

Column 4, line 24, "procucts" should be --products--.

Column 7, line 9, "3=50%" should be --3=75%, 2=50%--.

Signed and Sealed this

Twentieth Day of July 1982

[SEAL]

Attest:

GERALD J. MOSSINGHOFF

Attesting Officer  Commissioner of Patents and Trademarks